United States Patent
Rodriguez et al.

(10) Patent No.: US 12,470,458 B2
(45) Date of Patent: Nov. 11, 2025

(54) COMPUTER IMPLEMENTED METHOD FOR CONFIGURING A PROCESS NETWORK

(71) Applicant: ABB Schweiz AG, Baden (CH)

(72) Inventors: Pablo Rodriguez, Birkenau (DE); Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 37 days.

(21) Appl. No.: 18/635,155

(22) Filed: Apr. 15, 2024

(65) Prior Publication Data
US 2024/0356801 A1 Oct. 24, 2024

(30) Foreign Application Priority Data
Apr. 21, 2023 (EP) .................................. 23169201

(51) Int. Cl.
*H04L 41/0806* (2022.01)
*H04L 41/12* (2022.01)
(Continued)

(52) U.S. Cl.
CPC .......... *H04L 41/0806* (2013.01); *H04L 41/12* (2013.01); *H04L 47/2475* (2013.01); *H04L 47/28* (2013.01); *H04L 67/12* (2013.01)

(58) Field of Classification Search
CPC . H04L 41/12; H04L 41/0803; H04L 41/0816; H04L 41/40; H04L 41/5054;
(Continued)

(56) References Cited

U.S. PATENT DOCUMENTS

| | | | |
|---|---|---|---|
| 2003/0101253 A1* | 5/2003 | Saito | H04L 45/02 709/223 |
| 2019/0052543 A1 | 2/2019 | Bansal et al. | |

FOREIGN PATENT DOCUMENTS

| | | | |
|---|---|---|---|
| EP | 3993322 A1 | 5/2022 | |
| EP | 4113938 A1 * | 1/2023 | ......... H04L 41/0853 |
| EP | 4113941 A1 | 1/2023 | |

OTHER PUBLICATIONS

European Patent Office, Extended European Search Report in European Patent Application No. 23169201.3, 15 pp. (Oct. 16, 2023).

*Primary Examiner* — Tonia L Dollinger
*Assistant Examiner* — Linh T. Nguyen
(74) *Attorney, Agent, or Firm* — Leydig, Voit & Mayer, Ltd.

(57) ABSTRACT

A method for creating a configuration of a communication network, which includes networking and automation devices with embedded networking functions, the automation devices comprising communication endpoints providing and/or consuming application data of attached automation application functions running on the automation devices. The method includes communicating information about application functions and intents, receiving and resolving, by determining physical or virtual devices according to the network topology, to obtain identities and addresses of the communication endpoints; receiving timing information and further QoS requirements, and binding, taking into account the timing information and the further QoS requirements; creating qualified connectivity requests for the communication between the identifiable and addressable communication endpoints, and obtaining configuration information according to which the process network can be configured.

17 Claims, 6 Drawing Sheets

(51) Int. Cl.
*H04L 47/2475* (2022.01)
*H04L 47/28* (2022.01)
*H04L 67/12* (2022.01)

(58) Field of Classification Search
CPC .............. H04L 41/0895; H04L 41/145; H04L 41/0823; H04L 41/5003; Y02D 30/00
See application file for complete search history.

COMPUTER IMPLEMENTED METHOD FOR CONFIGURING A PROCESS NETWORK

CROSS-REFERENCE TO RELATED APPLICATIONS

The instant application claims priority to European Patent Application No. 23169201.3, filed Apr. 21, 2023, which is incorporated herein in its entirety by reference.

FIELD OF THE DISCLOSURE

The present disclosure generally relates to computer implemented methods for configuring a process network of process automation, a process network engineering system, and a process network.

BACKGROUND OF THE INVENTION

Industrial plants are sometimes embodied in engineering documents such as Piping and Instrumentation Diagrams (P&IDs), In/Out (IO) Lists, and Control diagrams, among others. In order to control the process of the plant. To control the process of the plant, the Operational Technology (OT) system is configured based on the requirements defined in the engineering documents. OT systems consist of a hardware collection such as IO modules, industrial controllers, servers, and operator workplaces (summarized as automation devices) that require to communicate with each other via networking devices such as network switches, routers, and firewalls. To configure the network properly, it is necessary to know the communication flow between nodes in the OT system due to the inputs and output signals along with data-rate, latencies, reliability, and other Quality of Service (QOS) properties and the allocation of control functions and/or services running in each of the OT system nodes.

Today, the network configuration is done manually after the control functions have been configured and allocated. Only in a later phase of the project can the actual network performance be tested.

BRIEF SUMMARY OF THE INVENTION

The present disclosure describes systems and methods for improved network engineering. The described embodiments similarly pertain to the computer implemented method for configuring a process network of process automation, the process network engineering system, and the process network. Synergetic effects may arise from different combinations of the embodiments although they might not be described in detail.

All embodiments of the present disclosure concern a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect, a computer implemented method for creating a configuration of a communication network of an automation system is provided, wherein the communication network includes networking and automation devices with embedded networking functions, the automation devices comprising communication endpoints providing and/or consuming application data of attached automation application functions running on the automation devices.

The method comprises the following steps: as a first step, communication information comprising required communication connections between application functions attached to the communication endpoints and connection requirements of the respective connections is received and communication intents containing a structured definition of the required communication connections combined with their connection requirements are created. In a further step, network topology information is received and the communication endpoints are resolved by determining physical or virtual devices according to the network topology to obtain identities and addresses of the communication endpoints, which are therefore then identifiable and addressable. In a next step, timing information and further QoS requirements are received, and the communication intents are bound taking into account the timing information and the further QoS requirements, i.e., the timing information and the further QoS requirements are specified for the communication endpoints. In a further next step a qualified connectivity request for the communication between the identifiable and addressable communication endpoints is created for obtaining configuration information according to which the process network can be configured.

BRIEF DESCRIPTION OF THE SEVERAL VIEWS OF THE DRAWING(S)

DETAILED DESCRIPTION OF THE INVENTION

Figure 1:
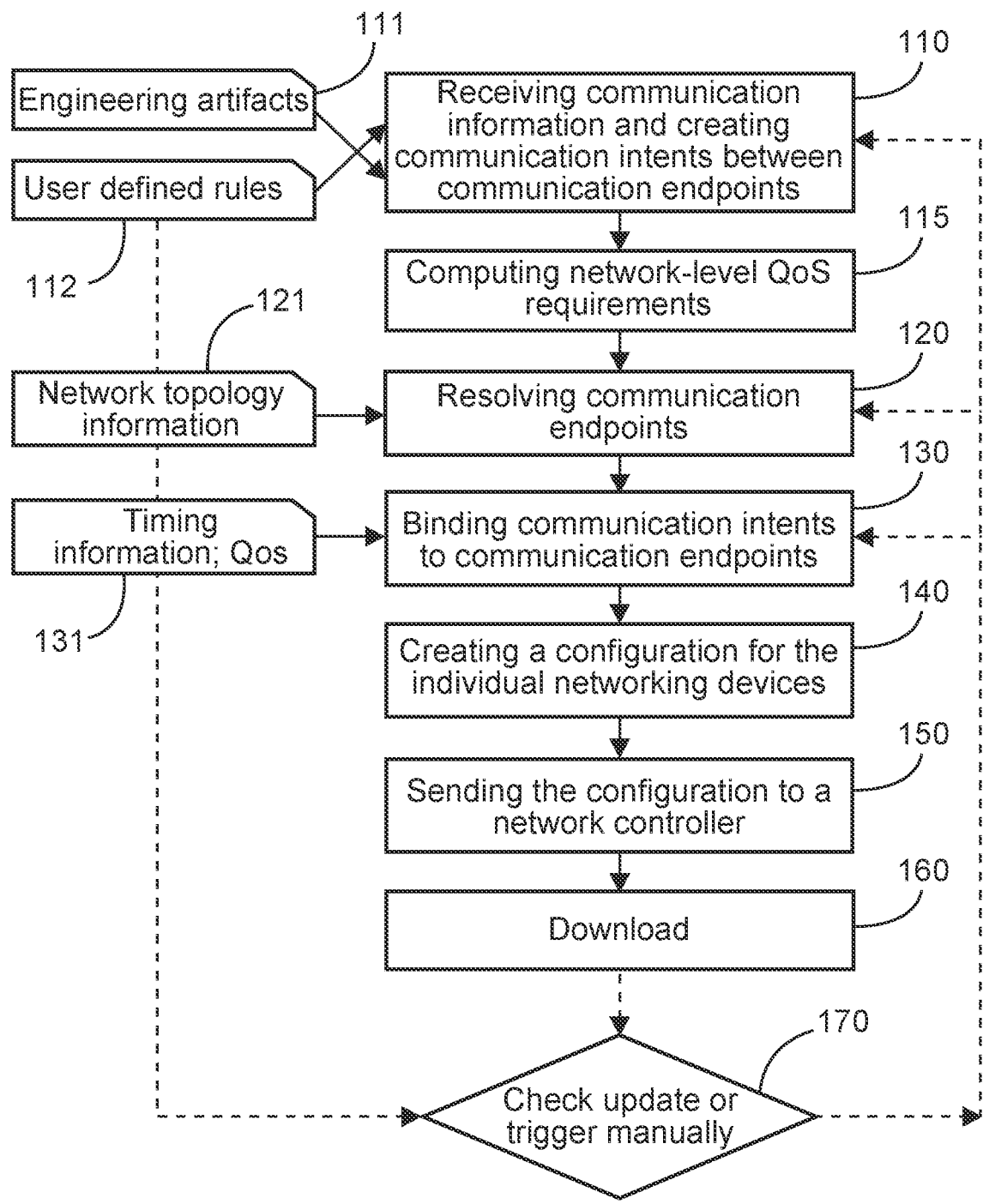
FIG. 1 is a flow diagram of a method in accordance with the disclosure.

Corresponding parts are provided with the same reference symbols in all figures. FIG. 1 shows a flow diagram of a method for configuring networking devices including the steps for automatically creating the configuration for the individual networking devices of the control system. In step 110, the communication intents between communication endpoints are created using the information from engineering artifacts 111, such as IO allocation described in an IO list or IO mapping to control applications. Further, rules 112 previously defined by a user and readily available are input for creating the communication intents. The communication intents therefore include process input data and process output data, e.g. for controlling and monitoring the process, as well as network parameters describing the expected or required network behavior such as latency or network state such as whether a port-based access control on a network segment is enabled. The communication intents may be stored in a volatile memory or may be stored, for example, as a file in a non-volatile memory.

Figure 5:
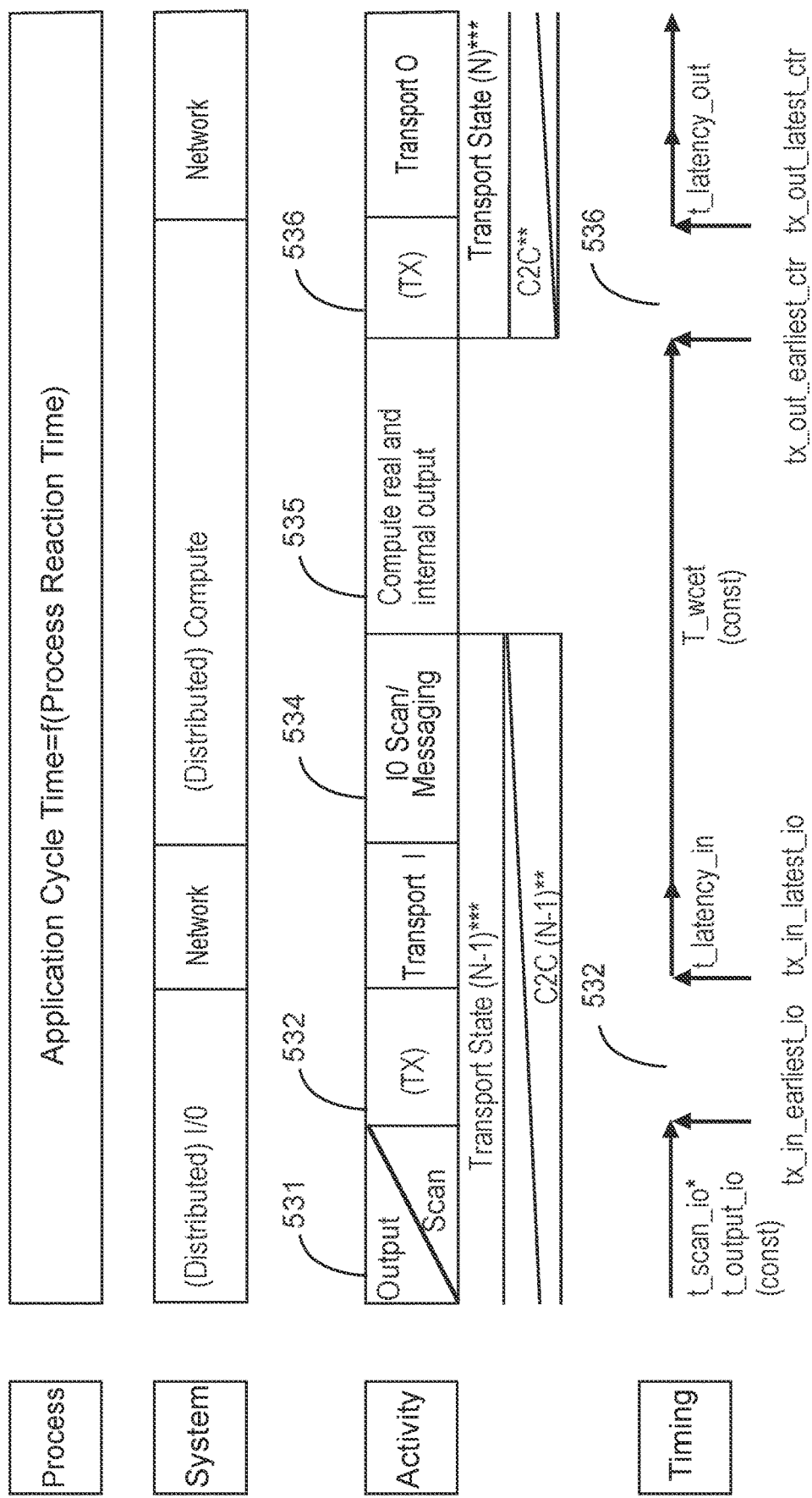
FIG. 5 is an example of a schema to calculate timing-information for communication intent based on rules in accordance with the disclosure.

The communication intents therefore define the intended communication between endpoints and higher-level communication parameters, which still have to be bound to specific physical devices. The binding depends further on the network topology, i.e. the devices between communication endpoints for which a communication is intended, possible routes and QoS requirements. Therefore, in step 120, the communication endpoints are resolved using information, for example, from engineering tools, where the allocation of control applications to controllers is specified, from the orchestration deployment results, from an offline description of the network topology, e.g. implemented in TOSCA, or by discovering the online topology using protocols such as LLDP preferably in combination with Redfish. After resolving the communication endpoints and networking devices, in step 130, the communication intents are bound to parameters specific for the physical networking devices using timing information and rules to define the QoS of the data streams to be configured. The timing information includes, for example, a definition of a window, within which data may be started to be transmitted or to be received, and a minimum and/or maximum period between transmission start time and receive time. FIG. 5 shows an example of a timing diagram with such parameters. Still referring to FIG. 1, the QoS information includes, for example, expected cyclic data, jitter, speed in each direction, redundancy, latency, and jitter, etc. After the binding of the communication intents, in step 140, for the communication intents qualified in this way, connectivity requests are created and passed in step 150 to the network controller, e.g. using API calls. The network controller creates a configuration for each of the networking devices based on the bound communication intent and the topology information. These configurations include, for example, files that can be sent to a network controller. The network controller then downloads the individual configurations to the respective networking devices.

As also shown in FIG. 1, the method allows for repeating the creation of the configuration and also the configuring of the networking devices. The repetition is optional, therefore, the arrows are drawn with dashed lines. For example, the repetition is triggered by a check 170, whether one of the input information 111, 112, 121, 131 has changed. Depending on which information has changed, a jump is performed to the respective step 110, 120, or 130. The check 170 may additionally or alternatively comprise an input signal from, for example, engineering tools or network tools such as a network monitoring tool, or from an HMI, indicating that an update has to be performed. The repetition may further be triggered by checking 170 a response of the network controller to the API calls. For example, the network controller detects that the connectivity request cannot be fulfilled. Reasons may be for example, that the devices do not provide the required performance, missing required network devices, etc. Consequently, the network topology and/or configuration is updated, and required steps are repeated. The repetition may be performed during the process and the networking is active. The re-configuration may be applied to all networking devices or only to concerned networking devices.

Figure 2:
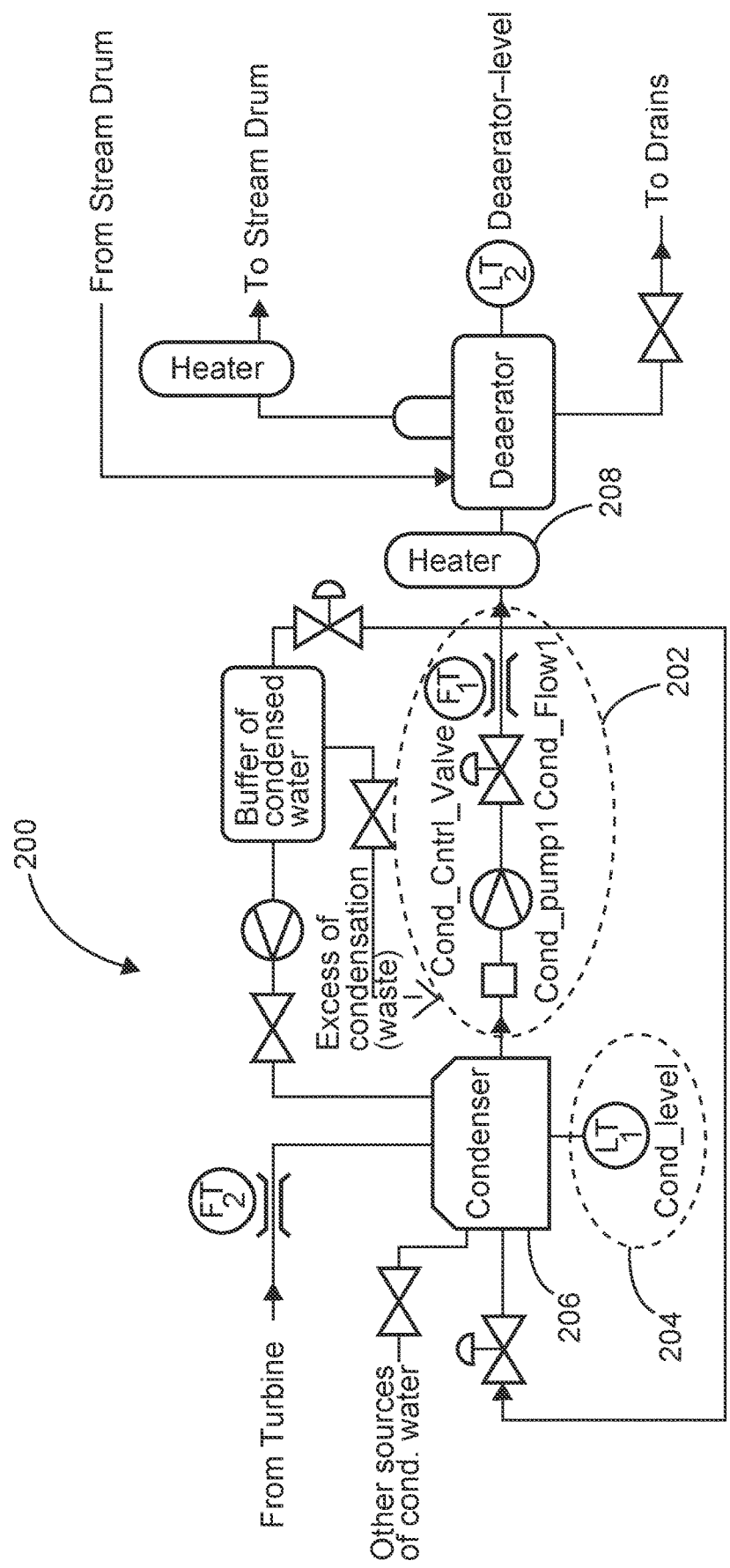
FIG. 2 is an exemplary embodiment of a P&ID of a process plant in accordance with the disclosure.

FIG. 2 shows an example of a P&ID diagram of a process plant 200. The proposed method assumes that a part of the engineering process for the configuration of the plant 200 is already done where IO points and control functions are allocated to nodes representing communication end points in the OT system. This part of the engineering process, which is an input but not part of the method proposed in this disclosure, is explained at hand of FIG. 2. Typically, a process engineer defines how to keep the process of the plant active in a safe manner. The documents generated by the process engineer are functional descriptions and P&IDs among others. Then, an automation engineer identifies process areas that must be allocated in the same control function and depicts the grouping with circles 202, 204 in the P&ID diagram. FIG. 2 hence shows an example of a plant 200 where the automation engineer identified a control function in the P&ID diagram including the process elements 202, 204. The process elements 202, 204 included in that function represent measurement devices, for example the condenser level measurement device 204, and actuators 202 such as a pump and a control valve. These functional process elements 202, 204 can be found in the IO list and functional descriptions. The automation engineer allocates the IO signals to IO modules following rules to fulfil plant specific requirements. Then, the control function is allocated to a control application and finally, the control application is allocated to a controller either physically or virtually.

Figure 3:
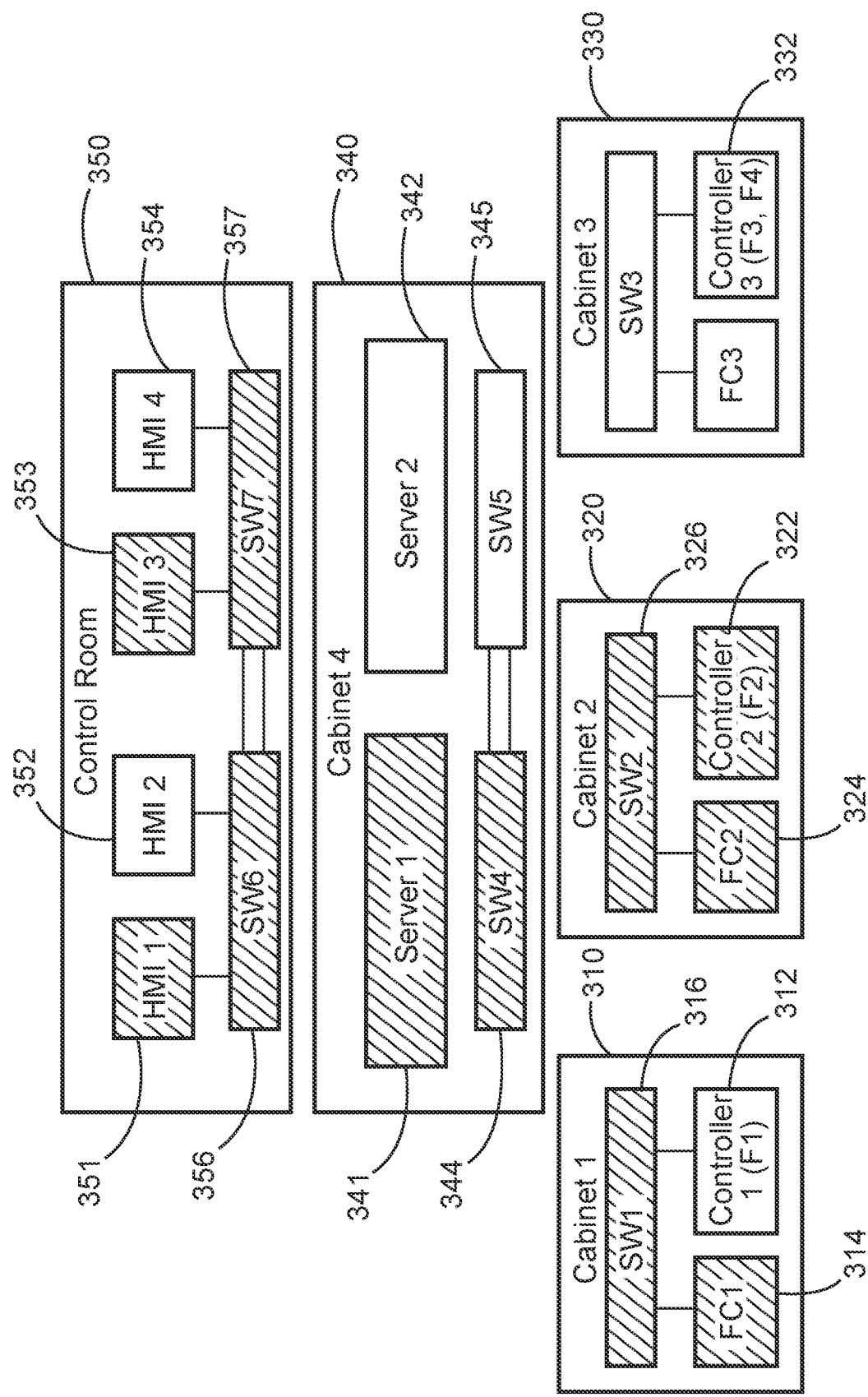
FIG. 3 is a diagram of an example of control function allocation in an OT system in accordance with the disclosure.

FIG. 3 shows a diagram of an example of control function allocation in a process network, here the OT system 300. The OT system 300 comprises Human Machine Interfaces HMI1 . . . . HMI4 351 . . . 354 in control room 350. In the example, a switch SW7 357 is connected to HMI3 353 and HMI4 354 and to a further switch SW6 356, which is connected to HMI1 351 and HMI2 352. The OT system 300 comprises further a cabinet 4, 340, with two servers, for example, OPC UA servers 341 and 342, and two switches SW4 344 and SW5 345. Further, cabinet 310 comprises a switch SW1 316, which is connected to a field communication interface 314 and controller 1 312, on which control function F1 is allocated. Similarly, cabinet 320 comprises a switch SW2 326, which is connected to a field communication interface 324 and controller 2 322 on which control function F2 is allocated, and cabinet 330 comprises a switch SW3 336, which is connected to a field communication interface 334 and controller 3 332 on which control functions F3 and F4 are allocated.

When the control function, e.g. F2 is deployed on the host devices such as, for example, controller 2, 322, in FIG. 3, it will consume signals from the IO modules such as, for example, field communication interface FC2 324, and it will generate other signals from the configured calculations necessary to control the process. The controllers, servers, field communication interfaces and HMIs are communication endpoints. The communication underlies QoS requirements and timing constraints, of which an example is shown in FIG. 5. Some of those signals will be historized in the control system and other signals will be used in the operator workplaces to monitor and operate the process.

Figure 4:
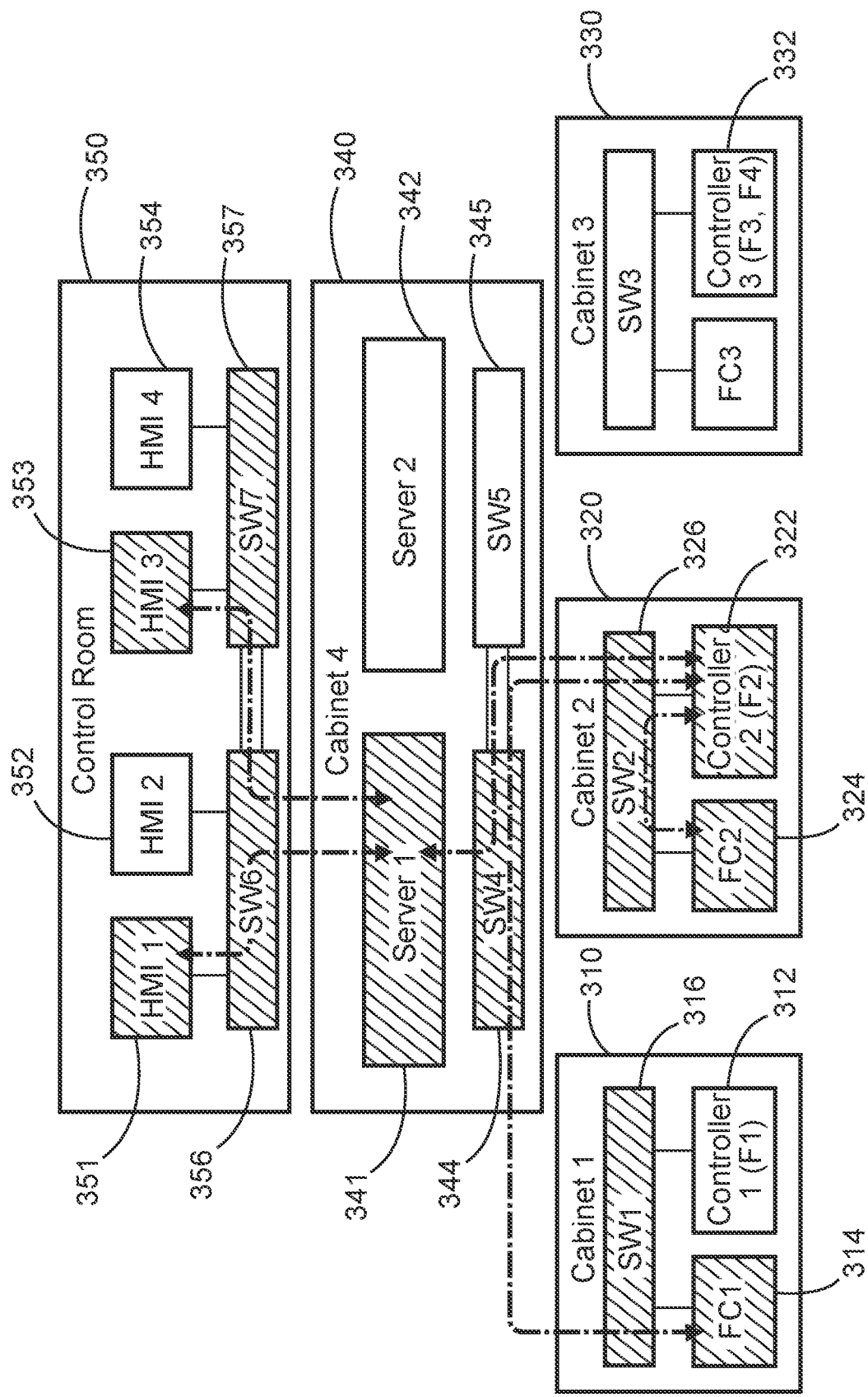
FIG. 4 is a diagram of data flow and network switches involved in accordance with the disclosure.

The control function F2 in this example reads and writes signals allocated in the field communication interfaces FC1 314 and FC2 324. Then, the signals are also used in server 1 341 where the data is historized and made available to operator workplaces HMI1 351 and HMI2 352. The data flows and switches that are involved in the communication required for the control function based on the previous allocation are depicted in FIG. 4. Today, the communication engineer must configure manually network switches SW1 316, SW2 326, SW4 344, SW6 356 and SW7 357 to fulfil the quality-of-service requirements of control function and this can only be done in a late stage of the project.

FIG. 5 shows an example of a schema to calculate timing-information for communication intent based on rules.

In particular, it shows a decomposition of Application Cycle N (stereotype from perspective of a single signal without intermediate idle times). In the following, the legend for the asterisk is provided:

const means this cannot be optimized; the value only depends on the concrete IO module configuration or the given control code.

controller to controller communication, i.e., to/from another controller/container; it might completely be considered by the receiving code instance within the same cycle or only in the next cycle. Code does have special considerations for internal signals vs. real IO, and it does not wait.

State transfer between redundant controllers/code instances; transmission it is sufficient to complete together with input in the next cycle. (TX) window to serialize multiple application frames/packets (e.g. OPC UA pub/sub Network Messages with contained Data Sets), when using time-slotted Ethernet, we need to provide the possible time windows to the TSN CNC and then configure the provided transmission offset back into the IO device/controller; for strict priorities with rate policing, which we propose as solution, the time window needs to be considered in principle when using multiple Network Messages, but it is expected to be negligibly short compared to the latency budget. The timing information or "timing properties" for control signals may be obtained along with the control application cycle time. That is, the timing properties are a process-related property, not a communication-related property.

The timing properties can be derived based on rules: The IO scan time t_scan_io 531 is a product property of the (remote) IO device and signal type (analog, digital, etc.) as is the transmission window (TX) 532 when it might send input data onto the network. IO scan time 534, compute time 535 in the controller and the transmission window 536 of the Output data are controller and application properties, respectively. As a result, we get clear time-slot windows 532 and 536 to associate with the communication intent and the precise available time that the network has to transport the Input and Output data, i.e. the communication latency-a property not available from the IEC 61131 application.

Figure 6:
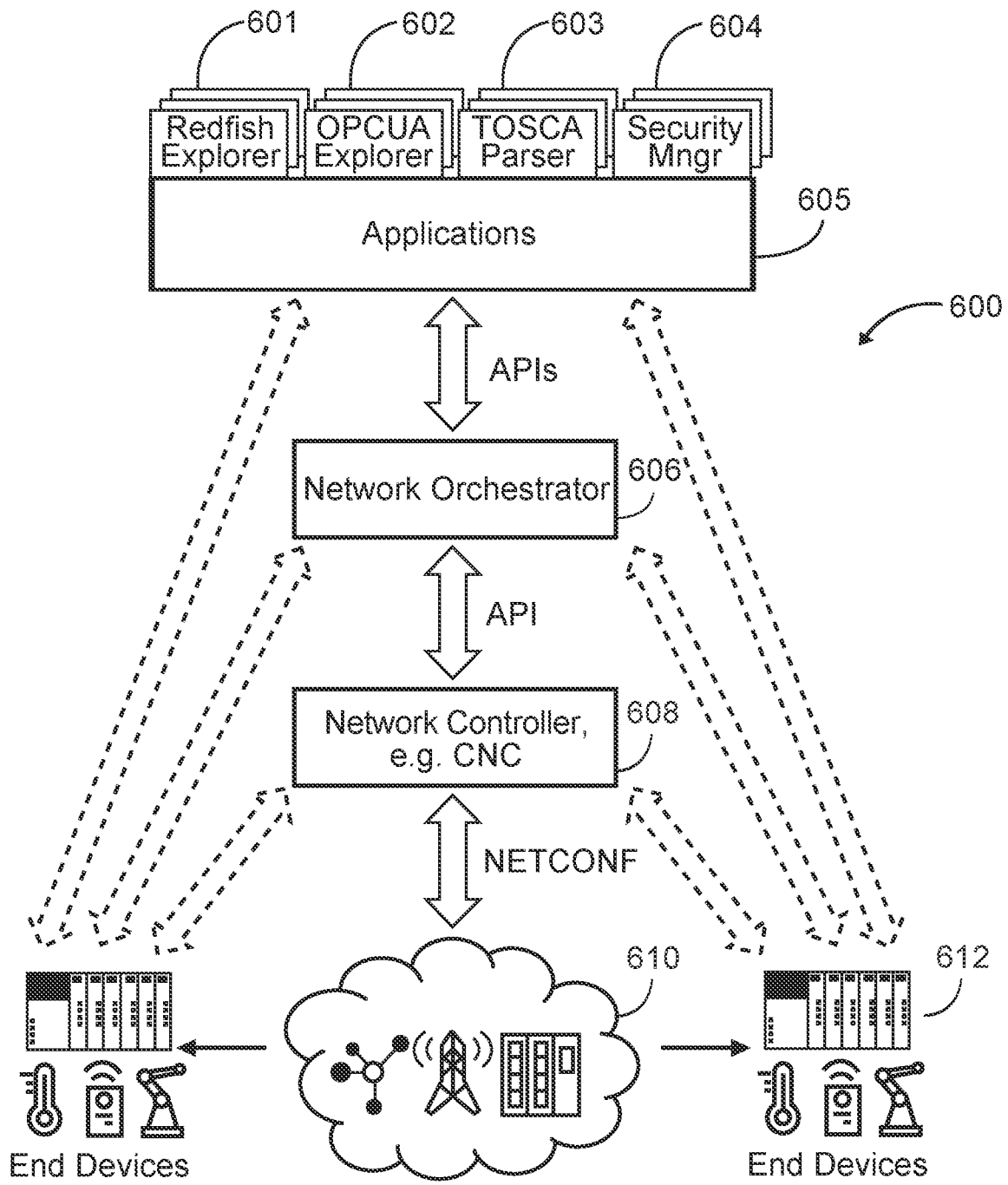
FIG. 6 is a diagram of a central network controller/process network engineering system and a process network in accordance with the disclosure.

FIG. 6 shows a diagram of a process network engineering system 600, a process network (610, 612) and the interaction of their high-level components. Applications 605 such as Redfish Explorer 601, OPC-UA explorer 602, TOSCA Parser 603 and security manager 604 provide engineering data or directly intent specifications and policies corresponding to the network topology information 121, and timing information and QoS 131 in FIG. 1. For that, the applications 605 communicate with the network orchestrator 606 using APIs. The network orchestrator 606 transforms the communication intents defined by engineering artifacts 111 and user defined rules 112 into communication intents with concrete communication endpoints and QoS taking into account topology, technology, vendor agnostic application needs. The network orchestrator 606 generates connectivity request bases on the communication intents and sends the transformed communication intents and sends the connectivity request to the network controller 608, e.g., a TSN (Time-Sensitive Networking) Central network controller (CNC) or a controller implementing TSN CNC functionalities using API calls. The Network controller configures the networking devices 610, 612, e.g. using the Network Configuration Protocol (NETCONF).

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

In the present disclosure networking devices can be, for example, communication endpoints and data-plane elements such as switches, routers, firewalls and other network functions. A networking device may contain one or more endpoints where traffic is received/sent from a data-plane or user-plane or control-plane function. Communication endpoints are, for example, HMI-Workstations used by operators for monitoring the process and controlling the process if necessary, controllers on which an application with one or more control function is running, or servers that are, for example, collecting the data and presenting the data to a client. Data-plane elements are, for example switches and routers. However, also, for example, switches that are arranged strategically, in the network may be communication endpoints, for example, if they are associated to or embedded in a controller.

Structured in "structured definition of the required communication connections" means for example a file containing pre-defined parameters, which are comma separated, hierarchical similar to XML-files, tables or the like.

Required communication connections are, for example, connections required by a control application, herein also referred to as "control application". The application receives, for example, data from sensors and provides data to a human machine interface and may send control data to actuators, all of which may be called "signals". Data may further be obtained from and/or sent to servers. The required connections and related quality parameters are defined in communication intents. The communication intents therefore define on an abstract level the intended communication between communication endpoints and the input from and output to the process. They further define what behavior or state is expected from the network without defining how this should be implemented. The intended communication may impact data streams which require a bandwidth or other characteristics that can be taken into account by defining connection requirements. These requirements are therefore also an input for creating the communication intents. When creating communication intents in the first step, the communication endpoints are not yet specified as distinct virtual or real physical devices or addressable devices, because the network topology is not yet a relevant point at this stage or has not even been designed or the addresses of its elements are not yet known or because virtualized application functions have not yet been deployed on particular hosts and the topology will therefore come into play in a later step. A behavior of the network is, for example, a dynamic behavior such as latency to be guaranteed between two endpoints or a static state such as enabling port-based access control on a network segment. An intent specification may imply certain traffic that will be transmitted over the network, as for example, OPC UA pub sub between controller and IO, or EAP-TLS communication between a switch and a RADIUS server. Therefore, requirements for the traffic have to be fulfilled and specified.

These requirements as well as the required communication between the communication endpoints for communicating the process data for, for example, monitoring and controlling the process parts of the process are input from existing information sources based on, for example, an engineering processing or by the user, as, for example, user defined rules.

The topology may be an existing topology, an emulated topology or a simulated topology, or any combination of these topologies. The timing information may relate to a process cycle, i.e., maximum or minimum of time intervals for receiving process data, sending control data, sending data to a human machine interface, etc. The timing information may include, for example, dependencies between these intervals so that transmit and receive windows are specified, and latencies are taken into account or maximum latencies are specified, respectively.

The binding of the communication intents to the communication endpoints taking into account the timing information and further QoS requirements allows for creating a qualified connectivity request, where "qualified" relates the timing and QoS information required by and resulting from the application, which is also provided in the request. The request may be, for example a request to a network controller that processes the request and may create configurations for the networking devices or may detect that the networking devices are not capable to fulfill the connectivity request. The term connectivity request used in singular form may include a connectivity request for each of the intended connections.

The method may be performed before setting up a processing plant and starting the process. However, since it is independent from the process engineering and automation engineering, that is, it does not rely on the sequence of these engineering phases, it may be performed during a running process. The method may, for example, comprise detecting actively, e.g. by scanning files, or passively, e.g. by receiving an input, a change of a file such as an artifact file, a user input, the topology, the communication intents, a relevant change in the engineering environment, etc. and start an update process. That is, the method can be executed any time, provided the input information is available. This allows for easy adapting or updating the network configuration when changes in the process, the network, or adjustments are necessary. For example, if a further redundancy of a path is required, a process element or a control application is changed, the network configuration can be updated automatically, without need of re-engineering requiring process engineers, automation engineers and network engineers.

According to an embodiment, the process network comprises a network controller, the qualified connectivity request is sent to the network controller for creating a configuration for the networking devices, and the network controller creates a network configuration and configures the networking devices with the network configuration by downloading the network configuration to the networking devices and/or returns a network configuration, which can be used for configuring the network devices.

The network controller receives the qualified network requests and may create a configuration for each of the available networking devices including communication endpoints and data-plane elements, based on the available network topology. The network controller sends, i.e., downloads the configuration for each of the networking devices to be configured to these networking devices, which completes the configuration process, at least until it receives new qualified connectivity requests. Alternatively or additionally, the network controller creates a network configuration but does not download the configuration to the network devices. Instead, it returns a network configuration as feedback, which can be used for configuring the network devices later or can be used for updating the network configuration if, for example, requirements are not met or the configuring would fail.

According to an embodiment, the step receiving communication information and creating communication intents comprises reading data from at least one existing engineering artifact, and the connection requirements are user defined rules.

Such an engineering artifact is, for example, an IO list describing the IO allocation of network elements or an IO mapping to control applications. The engineering artifacts are products of an IO engineering process that has been performed previous to and independent of the method for network engineering. That is, the engineering artifacts are already existing information that is readily available as input to the method.

The connection requirements may be user defined rules such as a redundancy policy that specifies, for example, which devices or paths in the network have to be redundant. The user defined rules may be stored, for example, in a volatile memory or as files, which are accessed by a processing device, which runs a network orchestrator as input for creating communication intents.

According to an embodiment, the step receiving network topology information and resolving communication endpoints comprises receiving information about an allocation of control applications to controllers specified in engineering tools, orchestration deployment results of virtualized applications on software runtime environments, an allocation of I/O signals or signal sets to I/O devices and/or an offline topology or an discovered online topology.

By resolving communication endpoints, real or virtual physical devices are determined in the network, and the communication endpoints that were previously specified as, for example, device types or generally input or output entities for the process, are mapped to addressable an identifiable distinct physical or virtual devices. In particular, devices may be identified by their IDs in the process network and/or addresses such as MAC addresses are assigned or determined for the devices, etc. Further, data-plane elements are determined in the network topology that are required for forwarding the data between the communication endpoints. The resolution or determination may be accomplished either by using allocation information defining the allocation of controllers in control applications. Such an allocation may be, for example, specified in engineering tools such as engineering tools compliant to standards such as IEC 61131 or IEC 61499. Or, the resolution or determination may be accomplished by the orchestration deployment results, for example from the Topology and Orchestration Specification for Cloud Applications (TOSCA), the offline topology, which may also be described, for example, in TOSCA, or online topology discovered using protocols such as Link Layer Discovery Protocol (LLDP), SNMP, NETCONF/RESTCONF or Redfish. That is, also the information about the resolution of endpoints is readily available from engineering and/or networking tools as input.

According to an embodiment, the offline topology is derived from a meta-model or is described as a topology model and/or from a standardized network description.

According to an embodiment, the offline topology comprises an application topology, wherein the application topology comprises the communication endpoints and network services required by the application, and wherein the meta-model describes at least the network services. Additionally or alternatively, the offline topology comprises a physical topology, wherein the physical topology is obtained from the standardized network description, and wherein the standardized network description is contained in a data file.

For example, TOSCA provides a specific language to describe a meta-model, from which a topology may be derived. Such a meta-model does not describe the topology itself but rather, for example, networking services, and may further contain QoS specifications or require QoS conditions. The topology to provide the services and/or the QoS requirements can be derived from such a meta-model in a separate step. The TOSCA service topology, is not deployed onto a physical topology, however, after deployment, there is an operational model, which includes the deployment information. For getting the deployment information, e.g., a previous meta-model deployment onto the endpoints may be used.

A physical topology model may be specified in specific files that may be based, for example, on XML or other standards, or may be available as a YANG model.

According to an embodiment, the online topology is discovered using a Link Layer Discovery Protocol, LLDP, preferably in conjunction with a management protocol such as Simple Network Management Protocol (SNMP) or NETCONF/RESTCONF, and/or Redfish protocol.

These protocol standards are suitable for detecting topology information online and may be combined. While LLDP delivers information about neighboring networking devices, optionally in conjunction with a management protocol such as SNMP or NETCONF/RESTCONF, provides supplementary infrastructure information to derive the topology. Also the Redfish protocol provides infrastructure information. The function of a Redfish service is to receive an HTTPS request and to return a response about the resource.

According to an embodiment, the wherein the timing information and further QoS requirements include: amount of data to be transmitted during a defined time period, earliest and latest transmission time, I/O scan time of a network controller, input scan time of I/O devices or individual channels, compute time in the physical or virtualized process controller, data output time, expected cyclic data, redundancy and/or latency and jitter.

The parameters of the timing information may be defined additionally to the QoS parameters. The list is not exhausted in this. Further timing parameters may be specified. For example, the timing information defines a window, within which data may be started to be transmitted or to be received, and a minimum and/or maximum period between transmission start time and receive time. QoS information is, for example expected cyclic data, jitter, speed in each direction, redundancy, latency, and jitter, etc.

By the forwarding information, a path or a set of paths in case of redundancy in terms of data-plane elements such as routers, switches or gateways between the communication endpoints is defined. For each of the data-plane elements information to identify traffic related to a specific intent including source and destination MAC or IP addresses, TCP/UDP ports, and other standardized header data along with forwarding instructions and information related to QoS mechanisms such as data rates, time-slots, and other traffic shaping mechanisms are adjusted such that the requirements for the communication intents are fulfilled.

According to an embodiment, the configuration of networking devices comprises creating a file containing a YANG model, wherein the YANG model describes the configuration of the networking devices.

The YANG model allows to describe the information such as the forwarding configuration for the network elements, the timing information for receiving and/or transmitting, and/or the QoS information for a transmission in a structured and standardized way, and is understood by the networking devices.

According to an embodiment, the qualified connectivity request for the communication between identified and addressable communication endpoints is performed using an API call.

When the endpoints are determined and the QoS for the data streams is defined, the network controller is requested to compute the configuration for the networking devices. The request is performed using API calls containing the timing information and the QoS requirements. The network controller creates configuration data and sends the data to the networking devices.

The network controller may also create feedback whether the configuring of the networking devices was successful. The feedback may be provided as API-call response. If it is not possible to configure all devices, for example, due to an insufficient topology, the network controller responds to the respective API calls with a message that the configuration failed. The network controller may also add information about the root cause to the message. The response is checked and if a failure has occurred, the network configuration is updated.

Therefore, the networking devices are configured using information available in the process engineering and in the network. Process engineering includes software usually used for the process and automation engineering, and includes engineering tools such as control and HMI engineering, orchestration tools, CAD tools, network tools, which may also be part of the operation system or scripts running in the operation system, and other tools known to a process and/or automation engineer.

According to an embodiment, after the step of creating a qualified connectivity request for the communication between identified and addressable communication endpoints a step is performed receiving a synchronous or asynchronous response or notification from the network controller containing information whether the creation of the configuration of the networking devices and/or the configuring of the networking devices was successful and/or why the creation of the configuration of the networking devices and/or the configuring of the networking devices was not successful.

If the creation of the configuration of the networking devices and/or the configuring of the networking devices was not successful, the response from the network controller provides information that can be used to improve or adapt the topology to the desired intents and/or the requirements regarding the topology. This information is also one of several update information as described in the following.

In embodiments, the configuration or parts of it is received in case it could be created, stored, and later passed to the controller for download as embodiment. That is, the controller is not directly asked to download a configuration it creates based on intent.

According to an embodiment, the method further comprises the step receiving update information, e.g., changes of the input information or information based on the response of the network controller, and repeating at least a part of the method steps dependent on the update information.

The update information may be information that one or more of the following inputs have been changed: engineering artifacts, user defined rules, network topology information, timing information, QoS. Depending on what has changed, the method steps may be repeated starting from the corresponding method step. For example, when automation engineering artifacts or user defined rules have been changed, the repetition starts with creating communication intents. If the network topology information has changed, the repetition starts with the step resolving communication endpoints, and if timing information and/or QoS requirements have changed, the repetition starts with the step binding communication intents to communication endpoints.

The update information may further be the response from the network controller whether the configuring of the networking devices has been successful. The network controller also monitors if the qualified communication intents and/or connectivity request are performing according to their specification or requirements or not and sends notifications back to the instance that created the communication intents and specifications or requirements, for example a network orchestrator. In case the specifications could not be fulfilled at any future point in time, steps of the method are repeated to either change the topology or the requirements, including the values of the timing parameters, redundancy, and/or QoS requirements, etc. If root cause information is available, the root cause may be overcome and dependent on the root cause and necessary changes the first method step to be repeated may be, for example, creating communication intents, resolving communication endpoints, binding communication intents to communication endpoints.

Summarized, the method provides an automatic generation of configuration of networking devices using automation and network topology engineering data existing as natural result of automation and network design. Moreover, it provides automatic updating the configuration when conditions change or the configuration failed. Automatic generation of communication intents is applied using specific user-defined rules to specify QoS properties in communication intents. Therefore, current engineering tools and workflows can be used without modifications, except of possibly not using manual network configuration in the existing tools, resulting in a significant reduction of engineering effort. Further, no networking knowledge necessary.

According to a further aspect, a network engineering system for a communication network of an automation system, optionally converged with IT and telecoms networks that consists of networking devices is provided, where the process network consists of networking devices comprising communication endpoints providing and/or consuming application data and data-plane elements. The process network engineering system comprises at least one processing device configured to perform the steps of the method as described herein.

The processing device may run a network orchestrator for performing the steps of the method. The processing device as underlying hardware, i.e., the network operator as software may perform any steps of the method described herein except of the steps performed by the network controller.

The processing device may be or comprise one or more microprocessors, microcontrollers, microprocessor systems, Field Programmable Gate Arrays (FPGAs), signal processors or similar programmable devices or logic elements on which networking and engineering tools such as a network orchestrator can be run. The process network engineering system may further comprise HMI interfaces, memory devices, interfaces to the process network, etc. Moreover, the process network engineering system may comprise or have access to a network controller, which is configured to receive the qualified connectivity requests, which are, for example, API calls, and to download the received configuration to the networking devices of the process network.

According to a further aspect, a process network is provided. The process network comprises networking devices comprising communication endpoints providing and/or consuming application data and data-plane elements, a network controller that is configured to receive qualified connectivity requests from a process network engineering system. The network controller is further configured to create a configuration for the networking devices, and to configure the networking devices with the network configuration by downloading the network configuration to the networking devices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS 110-170 steps of the method, except of:
111 engineering artifacts (input to method step 110)
112 user defined rules (input to method step 110)
121 network topology information (input to method step 120)
131 timing information, QoS (input to method step 130)
200 P&ID diagram
202 condenser level measurement (one part of the control function)
204 group with condenser pump, flow and valve control (further part of the control function)
206 condenser
208 heater
300 OT system
310 cabinet 1
312 controller 1 with function F1
314 field communication interface FC1
316 switch SW1 in cabinet 1
320 cabinet 2
322 controller 2 with function F2
324 field communication interface FC2
326 switch SW2 of cabinet 2
330 cabinet 3
332 controller 1 with functions F3 and F4
340 cabinet 4
341 server 1
342 server 3
344 switch SW4 in cabinet 4
345 switch SW5 in cabinet 4
350 control room
351 Human Machine Interface HMI3
352 Human Machine Interface HMI4
353 Human Machine Interface HMI3
354 Human Machine Interface HMI4
357 Switch SW7
531 IO scan time
532 Time-slot window
534 IO scan time
535 Compute time
536 Time-slot window
600 Process network engineering system
601 Redfish Explorer
602 OPCUA Explorer
603 TOSCA Parser
604 Security Manager
605 ORCHID
606 Network Orchestrator, processing device on which the Network Orchestrator is run
608 Network controller
610 Process network, networking devices (includes also communication endpoints 612)
612 Communication endpoints: end devices

What is claimed is:

1. A computer implemented method for creating a configuration of a communication network of an automation system, wherein the communication network includes networking and automation devices with embedded networking functions, the automation devices comprising communication endpoints providing and/or consuming application data of attached automation application functions running on the automation devices, the method comprising:
    receiving communication information comprising required communication connections between application functions attached to the communication endpoints and connection requirements of the respective connections and creating communication intents containing a structured definition of the required communication connections combined with their connection requirements;
    receiving network topology information and resolving the communication endpoints by determining physical or virtual devices according to the network topology to obtain identities and/or addresses of the communication endpoints;
    receiving timing information and further QoS requirements, and binding communication intents taking into account the timing information and further QoS requirements;
    creating a qualified connectivity request for the communication between the identifiable and addressable communication endpoints for obtaining configuration information according to which the communication network can be configured.

2. The computer implemented method according to claim 1, wherein the process network comprises a network controller; wherein the qualified connectivity request is sent to the network controller for creating the configuration for the networking devices; and wherein the network controller creates a network configuration and configures the networking devices with the network configuration by downloading the network configuration to the networking devices and/or returns a network configuration which can be used for configuring the network devices.

3. The computer implemented method according to claim 1, wherein receiving communication information and creating communication intents comprises reading data from at least one existing engineering artifact, and wherein the connection requirements are user defined rules.

4. The computer implemented method according to claim 1, wherein receiving network topology information and resolving communication endpoints comprises receiving information about at least one of:
    an allocation of control applications to controllers specified in engineering tools;
    orchestration deployment results of virtualized control applications on software runtime environments;
    an allocation of I/O signals or signal sets to I/O devices; and
    an offline topology or a discovered online topology.

5. The computer implemented method according to claim 4, wherein the offline topology is derived from a meta-model.

6. The computer implemented method according to claim 4, wherein the offline topology is described as a topology model.

7. The computer implemented method according to claim 4, wherein the offline topology is derived from a standardized network description.

8. The computer implemented method according to claim 4, wherein the offline topology comprises an application topology; wherein the application topology comprises the communication endpoints and network services required by the application; and wherein the meta-model describes at least the network services.

9. The computer implemented method according to claim 4, wherein the offline topology comprises a physical topology; wherein the physical topology is obtained from the standardized network description; and wherein the standardized network description is contained in a data file.

10. The computer implemented method according to claim 4, wherein the online topology is discovered using a Link Layer Discovery Protocol (LLDP) in conjunction with a management protocol including SNMP, NETCONF/RESTCONF, and/or Redfish protocol.

11. The computer implemented method according to claim 1, wherein the timing information and further QoS requirements include: amount of data to be transmitted during a defined time period, earliest and latest transmission time, I/O scan time of a network controller, input scan time of I/O devices or individual channels, compute time in the physical or virtualized process controller, data output time, expected cyclic data, redundancy and/or latency and jitter.

12. The computer implemented method according to claim 1, wherein the configuration of networking devices comprises creating a file containing a YANG model, wherein the YANG model describes the configuration of the networking devices.

13. The computer implemented method according to claim 1, wherein the qualified connectivity request for the communication between identified and addressable communication endpoints is performed using an API call.

14. The computer implemented method according to claim 13, wherein after creating a qualified connectivity request for the communication between identified and addressable communication endpoints, the method further includes receiving a synchronous or asynchronous response or notification from the network controller containing information whether the creation of the configuration of the networking devices and/or the configuring of the networking devices was successful and/or why the creation of the configuration of the networking devices and/or the configuring of the networking devices was not successful.

15. The computer implemented method according to claim 1, wherein the method further comprises receiving updated information and repeating at least a part of the method dependent on the updated information.

16. A process network engineering system for a process network of process automation, the process network including networking devices having communication endpoints providing and/or consuming application data and data-plane elements, the process network engineering system comprises a processing device configured to:
　receive communication information comprising required communication connections between application functions attached to the communication endpoints and connection requirements of the respective connections and create communication intents containing a structured definition of the required communication connections combined with their connection requirements;
　receive network topology information and resolve the communication endpoints by determining physical or virtual devices according to the network topology to obtain identities and/or addresses of the communication endpoints;
　receive timing information and further QoS requirements, and bind communication intents taking into account the timing information and further QoS requirements; and
　create a qualified connectivity request for the communication between the identifiable and addressable communication endpoints for obtaining configuration information according to which the communication network can be configured.

17. A communication network, comprising:
networking and automation devices with embedded networking functions, the automation devices comprising communication endpoints providing and/or consuming application data of attached automation application functions running on the automation devices;
a network controller configured to receive qualified connectivity requests from a process network engineering system;
wherein the process engineering system comprises a processing device configured to:
　receive communication information comprising required communication connections between application functions attached to the communication endpoints and connection requirements of the respective connections and create communication intents containing a structured definition of the required communication connections combined with their connection requirements;
　receive network topology information and resolve the communication endpoints by determining physical or virtual devices according to the network topology to obtain identities and/or addresses of the communication endpoints;
　receive timing information and further QoS requirements, and bind communication intents taking into account the timing information and further QoS requirements; and
　create a qualified connectivity request for the communication between the identifiable and addressable communication endpoints for obtaining configuration information according to which the communication network can be configured;
wherein the network controller is further configured to create a configuration for the networking devices; and to configure the networking devices with the network configuration by downloading the network configuration to the networking devices and/or to return a network configuration which can be used for configuring the network devices.

* * * * *